GEORGE W. BRESSLER, OF LA FAYETTE, IOWA.

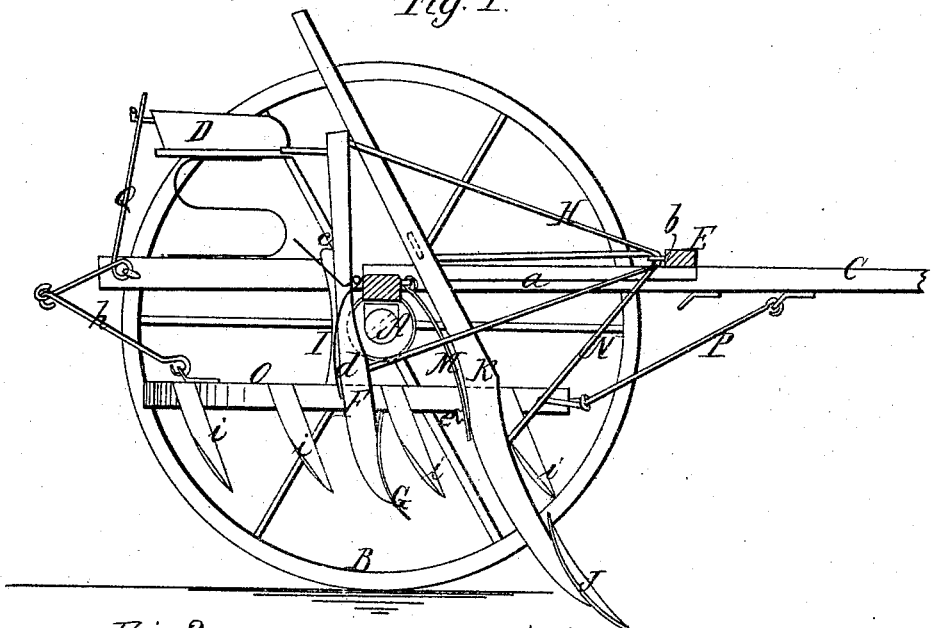

Letters Patent No. 88,363, dated March 30, 1869.

IMPROVEMENT IN COMBINED HARROW AND CULTIVATOR.

The Schedule referred to in these Letters Patent and making part of the same.

*To all whom it may concern:*

Be it known that I, GEORGE W. BRESSLER, of La Fayette, in the county of Linn, and State of Iowa, have invented a new and useful Improved Combined Harrow and Cultivator; and I do hereby declare that the following is a full, clear, and exact description thereof, which will enable others skilled in the art to make and use the same, reference being had to the accompanying drawing, forming part of this specification, in which—

Figure 1 is a side sectional view of my invention;

Figures 2, 3, 4, and 5, detached views of portions pertaining to the same.

Similar letters of reference indicate like parts.

This invention relates to a new and improved combination of a harrow and cultivator, whereby growing crops may be tilled in a much more thorough manner than usual; and It consists in the construction of parts, and their combination with each other, as will be hereinafter more fully described.

In the accompanying sheet of drawings,

A represents an axle, having a wheel, B, on each end of it; and c is a draught-pole, attached to the upper side of the axle, and projecting some distance behind it, the driver's seat D being attached to the rear part of the draught-pole.

E is a bar which is attached transversely to the draught-pole, and has the front ends of bars a secured to it, the rear ends of said bars being attached to the axle.

F represents standards, to which the outer shovels, or shares G are attached. These standards have each a bent, or V-shaped rod, H, attached, the angles of which are secured to the bar E by hooks b, which admit of the standards F being raised and lowered.

The standards F are behind the axle A, and the shares G are held down to their work, when required, by means of slotted bars I, connected by a joint to the rear side of the axle, the standards passing through the slots in the bars I, and the lower ends of the bars resting, or bearing on projections c, at the rear of the standards.

The standards F are retained in an elevated state, with the shares G, above ground, when desired, by having the lower ends of the slots in the bars I catch under projections d, at the rear of the standards. A standard thus held up, or retained, is shown in fig. 1.

The two inner shears J J are attached to the lower ends of long standards K K, which extend up in front of the driver's seat D.

These standards are attached by screws e to slotted plates M, which are connected by joints f to the front side of the axle A, the screws being allowed to work, or move freely in the slots.

The standards K are connected to the bar E by V-shaped rods N, precisely similar to the rods H, which connect the standards F to the same bar, and said standards have each a stirrup, g, attached, to receive the feet of the driver, the upper parts of the standards resting in the hollow of the arms of the driver.

By this means, the driver is enabled to move, or work the shares J J laterally, and also raise and lower the same, to conform to the inequalities of the surface of the ground, and the sinuosities of the rows of plants.

O represents a harrow, the frame of which is of V-form, and has its front end connected by a rod, P, to the draught-pole C, the rear end of the harrow being suspended by rods h to the ends of a lever Q, attached to the rear end of the draught-pole.

By this arrangement, the harrow may be readily raised and lowered, as required. In fig. 1 it is represented in an elevated state.

The teeth i of the harrow are curved, as shown in fig. 5, to throw the fine earth toward the plants, while the shares J are curved to throw the earth from the plants, the harrow working between the rows, and effectually pulverizing the earth, cutting out weeds, and rendering the soil loose and pliable.

Having thus described my invention,

I claim as new, and desire to secure by Letters Patent—

1. The standards F K, hung to the cross-bar E, by means of the V-shaped rods H N, substantially as and for the purpose herein shown and described.

2. The slotted plates M, hinged to the axle, and connected with the standards K, by means of the pin, or screw e, in the manner described.

3. The slotted bars I, hung to the rear of the axle, to operate in the manner and for the purpose herein set forth and shown.

4. The harrow O, suspended from the pole C, by the rod P, and raised and lowered by the lever Q and rod h, in combination with the adjustable standards F K, all operating as described, for the purpose specified.

GEORGE W. BRESSLER.

Witnesses:
WILLIAM WILSON,
SOLOMON YAMBERT.